United States Patent
Nishida

(10) Patent No.: US 12,009,691 B2
(45) Date of Patent: Jun. 11, 2024

(54) CONTROLLER AND CONTROL METHOD FOR POWER SUPPLY CIRCUIT, AND MEMORY MEDIUM

(71) Applicant: TOYOTA JIDOSHA KABUSHIKI KAISHA, Toyota (JP)

(72) Inventor: Hisato Nishida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 591 days.

(21) Appl. No.: 17/186,118

(22) Filed: Feb. 26, 2021

(65) Prior Publication Data

US 2021/0336473 A1 Oct. 28, 2021

(30) Foreign Application Priority Data

Apr. 24, 2020 (JP) ................ 2020-077476

(51) Int. Cl.
*H02P 9/04* (2006.01)
*H02J 3/14* (2006.01)
*H02J 7/00* (2006.01)
*H02J 9/06* (2006.01)
*H02P 9/48* (2006.01)

(52) U.S. Cl.
CPC ................ *H02J 9/06* (2013.01); *H02J 3/14* (2013.01); *H02J 7/0031* (2013.01)

(58) Field of Classification Search
CPC ............................ H02H 3/33; H02P 29/68
See application file for complete search history.

(56) References Cited

U.S. PATENT DOCUMENTS

2010/0296204 A1* 11/2010 Ichikawa ............. B60L 3/04
361/15
2016/0225564 A1* 8/2016 Tanaka ............... H02H 3/044

FOREIGN PATENT DOCUMENTS

JP 2012-178895 A 9/2012

* cited by examiner

*Primary Examiner* — Kawing Chan
*Assistant Examiner* — Charles S Laughlin
(74) *Attorney, Agent, or Firm* — Oliff PLC

(57) ABSTRACT

A controller for a power supply circuit, a control method for a power supply circuit, and a memory medium are provided. In a case in which a monitored value starts decreasing from when a second relay is de-energized, the controller measures elapsed time from when the monitored value starts decreasing to when the monitored value starts increasing. It is determined that a third relay has deteriorated when a determination condition, which includes a condition that the elapsed time is greater than or equal to a specified reference value, is met.

14 Claims, 6 Drawing Sheets

CONTROLLER AND CONTROL METHOD FOR POWER SUPPLY CIRCUIT, AND MEMORY MEDIUM

BACKGROUND

1. Field

The present disclosure relates to a controller for a power supply circuit.

2. Description of Related Art

For example, Japanese Laid-Open Patent Publication No. 2012-178895 discloses a controller for a power supply circuit. The power supply circuit includes a first relay, which is connected to a positive electrode of a battery, a second relay connected to a negative electrode of the battery, and a third relay. A resistor is connected in series with the second relay, and the third relay is connected in parallel with the second relay and the resistor.

When starting to supply power to a load, the controller executes a sequence process to energize the first relay, the second relay, and the third relay in that order, and then de-energize the second relay. This reduces an inrush current at the start of supply of power to the load.

A relay may have an anomaly such as inoperability due to welded contacts. In this regard, the controller of the above-described document determines whether at least one of the second relay, which is connected to the negative electrode, or the third relay has an inoperability anomaly based on whether there is a voltage change at the load when the first relay is energized.

A movable portion of the movable contact of a deteriorated relay collects wear debris generated by sliding motions. Deterioration of a relay thus reduces the operating speed of the movable contact. Such deterioration of a relay extends an activation delay from when the relay is energized to when the movable contact contacts the fixed contact (i.e. to when the contact portion is closed). However, the relay remains operable.

Therefore, even when an inoperability anomaly due to welding is determined as in the case of the controller disclosed in the above-described document, it may be impossible to determine deterioration of the relay.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present disclosure will now be described.

Aspect 1: A controller for a power supply circuit is provided. The power supply circuit includes a battery and relays. The relays include a first relay, a second relay, and a third relay. The first relay is connected to and located between a load and one of a positive electrode or a negative electrode of the battery. The second relay is connected to and located between the load and the other one of the positive electrode or the negative electrode of the battery. The second relay is connected in series with a resistor. The third relay is connected in parallel with the second relay and the resistor. The controller is configured to execute: a process that obtains, as a monitored value, a voltage of power supplied to the load from the power supply circuit; a sequence process that is executed when the power starts being supplied to the load, the sequence process energizing the first relay, the second relay, and the third relay in that order, and then de-energizing the second relay; a process that measures, in a case in which the monitored value starts decreasing from when the second relay is de-energized by execution of the sequence process, elapsed time from when the monitored value starts decreasing to when the monitored value starts increasing; and a process that determines that the third relay has deteriorated when a determination condition, which includes a condition that the elapsed time is greater than or equal to a specified reference value, is met.

The movable portion of the movable contact may collect wear debris generated by sliding motions. Progressed deterioration of a relay thus may reduce the operating speed of the movable contact. Thus, a deteriorated relay tends to extend activation delay from when the relay is energized to when the movable contact contacts the fixed contact (i.e. to when the contact portion is closed).

If such extension of activation delay occurs in the third relay, the contact portion of the third relay may be open at the time when the second relay is de-energized through the sequence process. In this case, the voltage at the load starts decreasing. When the contact portion of the third relay closes after a delay, the voltage, which has been decreasing, starts increasing. Such extension of the activation delay of the third relay may cause the voltage at the load to start decreasing when the second relay is de-energized by the execution of the sequence process. This extends a period of time from when the voltage at the load starts decreasing to when the voltage at the load starts increasing.

In this regard, the above-described configuration obtains, as the monitored value, the voltage of the power supplied to the load. In a case in which the monitored value starts decreasing from when the second relay is de-energized by the execution of the sequence process, the elapsed time from when the monitored value starts decreasing to when the monitored value starts increasing is measured. The third relay is determined to have deteriorated when a determination condition, which includes a condition that the measured elapsed time is greater than or equal to a specified reference value, is met. This allows for proper determination of deterioration of the third relay.

Aspect 2: In the controller of Aspect 1, the determination condition may include the condition that the elapsed time is greater than or equal to the reference value, and a condition that the determination that the elapsed time is greater than or equal to the reference value has been made a specified number of times or more, successively.

Even in a relay that has not deteriorated, a foreign object that is temporarily attached to the movable portion of the movable contact may cause the elapsed time to be greater than or equal to the reference value. However, a temporarily attached foreign object is often removed by motions of the movable contact. Thus, the elapsed time is unlikely to become greater than or equal to the reference value successively. In the above-described configuration, the third relay is determined to have deteriorated when the condition that the elapsed time is greater than or equal to the reference value is met, and, in addition, the determination that the elapsed time is greater than or equal to the specified reference value has been made a specified number of times or more, successively. This prevents a temporary operation anomaly of the third relay from being erroneously determined to be deterioration of the third relay.

Aspect 3: In the controller of Aspect 1, the determination condition may include the condition that the elapsed time is greater than or equal to the reference value, and a condition that the elapsed time is increasing.

As described above, even in a relay that has not deteriorated, a foreign object that is temporarily attached to the movable portion of the movable contact may cause the elapsed time to be greater than or equal to the reference value. However, a temporarily attached foreign object is often removed by motions of the movable contact. It is thus unlikely that the measured time will increase. In the above-described configuration, the third relay is determined to have deteriorated when the condition that the elapsed time is greater than or equal to the reference value is met, and, in addition, the elapsed time is increasing. The above-described configuration thus also prevents a temporary operation anomaly of the third relay from being erroneously determined to be deterioration of the third relay.

Aspect 4: A control method for power supply circuit is provided that executes the various processes described in any one of the above Examples.

Aspect 5: A non-transitory computer readable memory medium is provided that stores a program that causes a processor to execute the various processes described in any one of the above Examples.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A controller 100 for a power supply circuit 200 according to a first embodiment will now be described with reference to FIGS. 1 to 4. The power supply circuit 200 is employed in a vehicle VC, such as a hybrid vehicle or an electric vehicle, equipped with an electric motor 400 functioning as a drive source.

Figure 1:
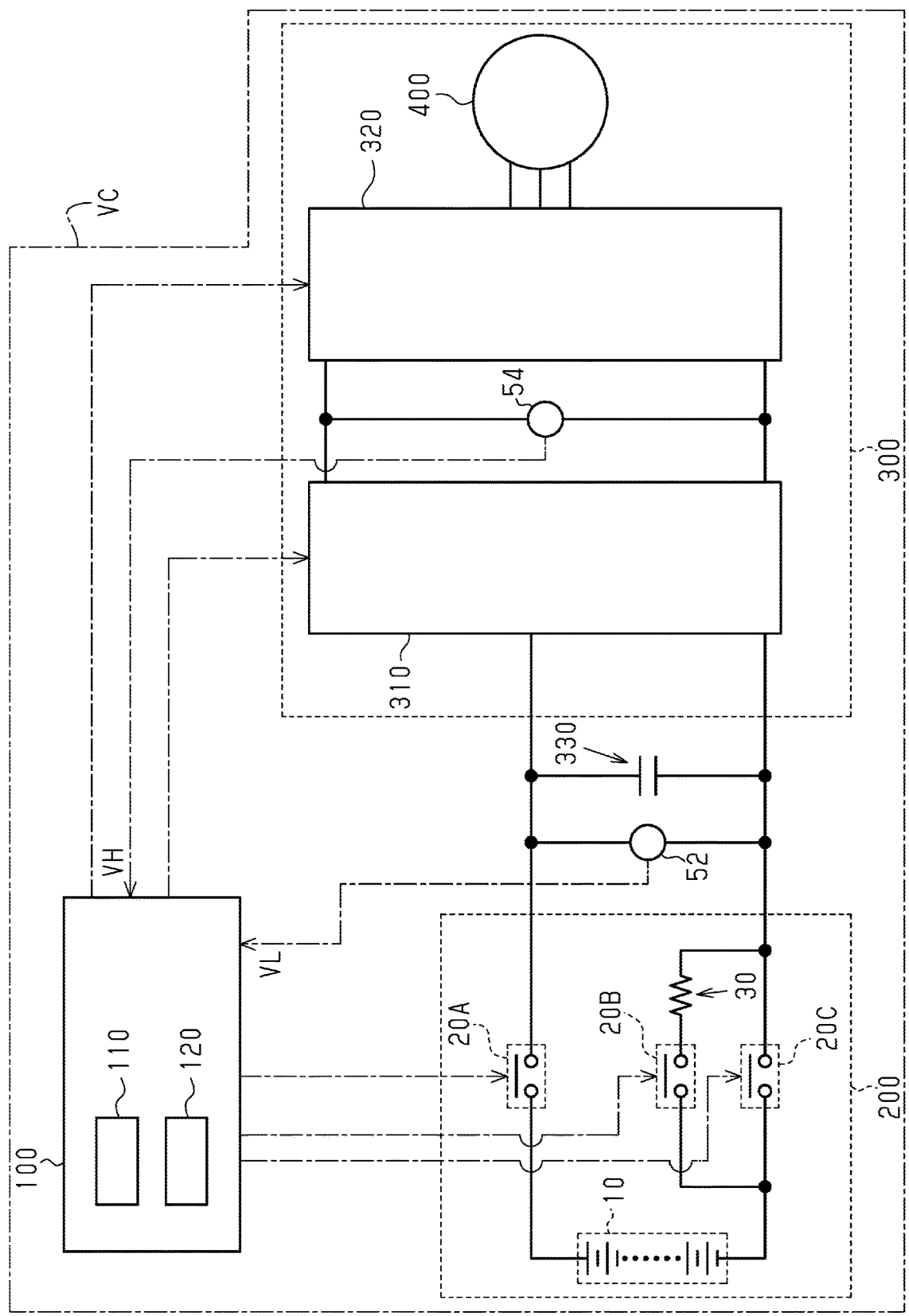
FIG. 1 is a schematic diagram showing a power supply circuit and a controller for the power supply circuit according to a first embodiment.

As shown in FIG. 1, the vehicle VC is equipped with the power supply circuit 200, an electrical load 300 (hereinafter, simply referred to as a load 300), which receives power from the power supply circuit 200, and the controller 100, which controls the power supply circuit 200 and the load 300.

The power supply circuit 200 includes a vehicle driving battery 10, a first relay 20A, a second relay 20B, a third relay 20C, and a resistor 30. The first relay 20A, the second relay 20B, and the third relay 20C each include a coil inside and a contact portion, which is closed when the coil is energized and exited. Specifically, each contact portion includes a fixed contact and a movable contact, which closes when contacting the fixed contact through excitation of the coil.

The first relay 20A is connected to and located between a positive electrode of the battery 10 and the load 300.

The second relay 20B is connected to and located between a negative electrode of the battery 10 and the load 300. The resistor 30 is connected in series with the second relay 20B.

The third relay 20C is connected to and located between the negative electrode of the battery 10 and the load 300, while being connected in parallel with the second relay 20B and the resistor 30.

The load 300 includes a converter 310, which is connected to the battery 10 via the relays 20A to 20C, an inverter 320, the electric motor 400. Power of a voltage increased by the converter 310 is supplied to the inverter 320. The electric motor 400 is connected to the inverter 320 and functions as a drive source of the vehicle VC. The number of electric motors connected to the inverter 320 may be changed. A capacitor 330 is connected in parallel with a side of the converter 310 that corresponds to the power supply circuit 200.

The controller 100 includes a central processing unit (hereinafter, referred to as a CPU) 110 and a memory 120, which stores programs and data that are used in control operations. The controller 100 executes various types of control operations by causing the CPU 110 to execute programs stored in the memory 120.

The controller 100 is connected to a first voltage detector 52, which detects the voltage of power supplied to the load 300. More specifically, the first voltage detector 52 detects a first voltage VL, which is the voltage of the power supplied to the load 300 from the battery 10.

The controller 100 is also connected to a second voltage detector 54, which detects a second voltage VH. The second voltage VH is the voltage of power supplied to the inverter 320 from the converter 310. The converter 310 and the inverter 320 are not operating immediately after the power supply circuit 200 starts supplying power to the load 300. At this time, the second voltage VH, which is detected by the second voltage detector 54, is equal to the voltage of the power supplied to the load 300 from the power supply circuit 200, specifically, the first voltage VL, which is the voltage of the power supplied to the load 300 from the battery 10.

The controller 100 controls energization and de-energization of the first relay 20A, the second relay 20B, and the third relay 20C, and the activation of the converter 310 and the inverter 320, thereby controlling the operating state of the electric motor 400.

When the ignition switch of the vehicle VC is turned on, power starts being supplied to the load 300 from the battery 10. At this time, the controller 100 executes an activation sequence process for the relays 20A to 20C. During the execution of the sequence process, the converter 310 and the inverter 320 are not operating.

Figure 2:
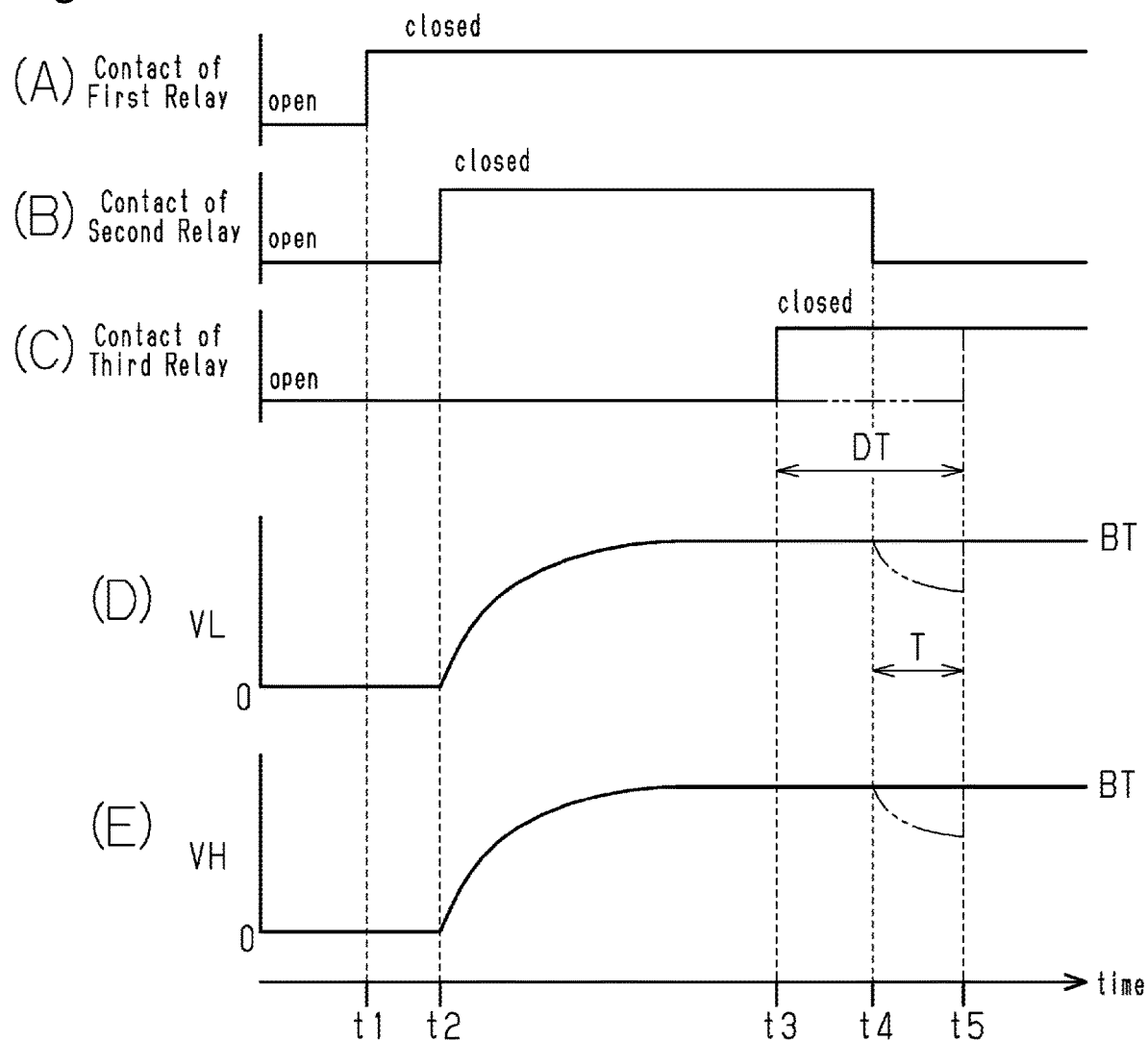
FIG. 2 is a timing diagram showing a case in which first to third relays of the first embodiment are sequentially energized, where Section (A) shows the state of the contact portion of the first relay, Section (B) shows the state of the contact portion of the second relay, Section (C) shows the state of the contact portion of the third relay, Section (D) shows changes in a first voltage, and Section (E) shows changes in a second voltage.

Sections (A) to (C) of FIG. 2 show changes in the states of the contact portions of the relays 20A to 20C through the sequence process during activation. Sections (D) to (E) of FIG. 2 show changes in the first voltage VL and the second voltage VH.

At the start of the sequence process, the controller 100 first energizes the first relay 20A as shown in Section (A) of FIG. 2 to close the contact portion of the first relay 20A (a point in time t1), thereby electrically connecting the positive electrode of the battery 10 and the load 300 to each other.

Next, the controller 100 energizes the second relay 20B as shown in Section (B) of FIG. 2 to close the contact portion of the second relay 20B (a point in time t2), thereby electrically connecting the negative electrode of the battery 10 and the load 300 to each other. This starts supply of power from the battery 10 to the load 300. Accordingly, as shown in Sections (D) and (E) of FIG. 2, the first voltage VL and the second voltage VH, which had been 0, start increasing toward a battery voltage BT, which is the voltage of the battery 10. At this time, since the power is supplied from the battery 10 to the load 300 via the resistor 30, an inrush current at the start of power supply to the load 300 is reduced in relation to the battery voltage BT.

Next, the controller 100 energizes the third relay 20C as shown in Section (C) of FIG. 2 to close the contact portion of the third relay 20C (a point in time t3), thereby electrically connecting the negative electrode of the battery 10 and the load 300 to each other via the third relay 20C and the second relay 20B.

Next, the controller 100 de-energizes the second relay 20B as shown in Section (B) of FIG. 2 to open the contact portion of the second relay 20B (a point in time t4), thereby electrically connecting the negative electrode of the battery 10 and the load 300 without the resistor 30 in between. Then, the controller 100 ends the sequence process at activation.

The movable portion of the movable contact of the third relay 20C is thought to collect wear debris generated by sliding motions of the movable portion. Progressed deterioration of the third relay 20C thus reduces the operating speed of the movable contact. Therefore, as indicated by the long-dash double-short-dash line in Section (C) of FIG. 2), deterioration of the third relay 20C tends to extend an activation delay DT from when the third relay 20C is energized to when the movable contact contacts the fixed contact (i.e. to when the contact portion of the third relay 20C is closed).

If such extension of the activation delay DT occurs in the third relay 20C, the contact portion of the third relay 20C may still be open at the time when the second relay 20B is de-energized by the sequence process (the point in time t4). In this case, as indicated by the long-dash double-short-dash lines in Sections (D) and (E) of FIG. 2, the first voltage VL and the second voltage VH, which are voltages on the load side, start decreasing in relation to the battery voltage BT.

Thereafter, when the contact portion of the third relay 20C is closed (a point in time t5) after the second relay 20B is de-energized (the point in time t4), the decreased first voltage VL and second voltage VH start increasing to return to the battery voltage BT.

Such extension of the activation delay DT of the third relay 20C may cause the first voltage VL and the second voltage VH to start decreasing when the second relay 20B is de-energized by the execution of the sequence process. This may also extend the time period from when the first voltage VL and the second voltage VH start decreasing to when the first voltage VL and the second voltage VH start increasing (the time period from the point in time t4 to the point in time t5 in FIG. 2).

In this regard, the present embodiment obtains, as a monitored value, the first voltage VL, which is the voltage of the power supplied to the load 300. In a case in which the first voltage VL, which is the monitored value, starts decreasing when the second relay 20B is de-energized, elapsed time T from when the first voltage VL starts decreasing to when the first voltage VL starts increasing is measured. It is then determined, based on the elapsed time T, that the third relay 20C has deteriorated and that there is a sign of a breakdown in the third relay 20C.

Processes executed by the controller 100 to perform such determination will now be described with reference to FIGS. 3 and 4.

Figure 3:
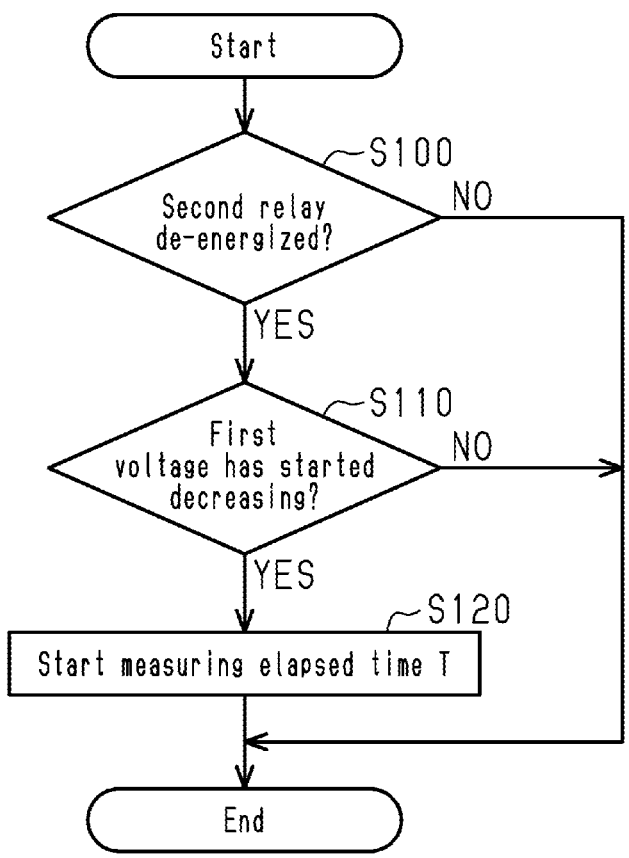
FIG. 3 is a flowchart showing a procedure of a process executed by the controller of the first embodiment.

FIG. 3 illustrates the procedure of a process executed by the controller 100 to start measurement of the elapsed time T. This process is repeatedly executed from when the ignition switch is turned on to when the elapsed time T starts being measured. In the following description, the number of each step is represented by the letter S followed by a numeral.

At the start of the process, the controller 100 determines whether the second relay 20B has been de-energized through the above-described sequence process (S100).

When determining that the second relay 20B has been de-energized (S100: YES), the controller 100 determines whether the first voltage VL has started decreasing (S110).

When determining that the first voltage VL has started decreasing (S110: YES), the controller 100 starts measuring the elapsed time T (S120) and ends the current process.

In contrast, when determining that the second relay 20B has not been de-energized in S100 (S100: NO) or when determining that the first voltage VL has not started decreasing in S110 (S110: NO), the controller 100 temporarily suspends the current process without executing the process of S120.

Figure 4:
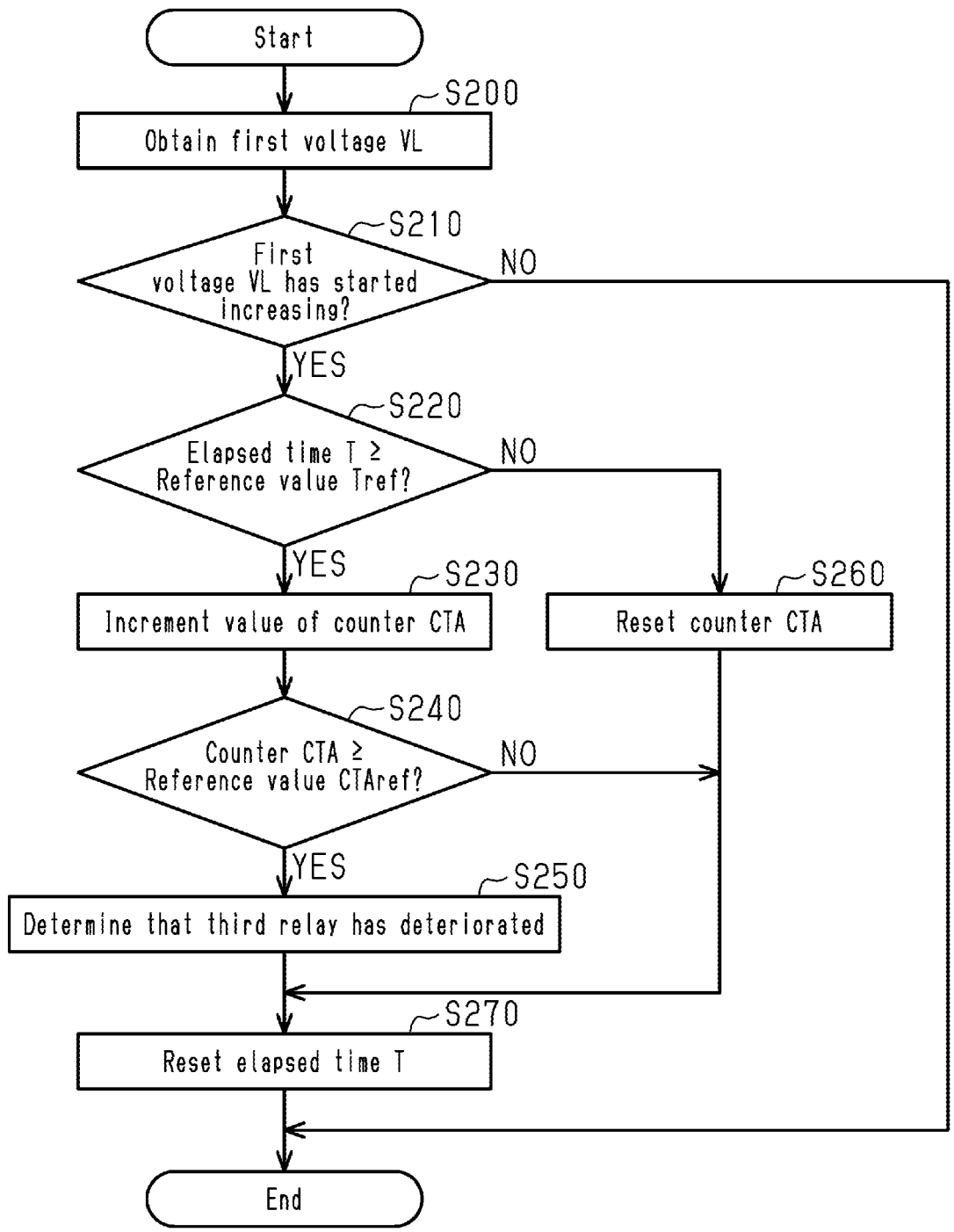
FIG. 4 is a flowchart showing a procedure of a determination process executed by the controller of the first embodiment.

FIG. 4 illustrates the procedure of a process executed by the controller 100 to determine deterioration of the third relay 20C. This routine is repeatedly executed during the measurement of the elapsed time T.

At the start of this process, the controller 100 obtains the first voltage VL (S200).

Next, the controller 100 determines whether the first voltage VL, which started decreasing when the second relay 20B was de-energized, has started increasing based on the obtained first voltage VL (S210). When determining that the first voltage VL has not started increasing (S210: NO), the controller 100 temporarily suspends the current process. If the first voltage VL does not start increasing after specified time (for example, time longer than a reference value Tref, which will be discussed below) has elapsed since the elapsed time T started being measured, the contact portion of the third relay 20C may be stuck open, so that the operating portion is inoperable. In this case, the controller 100 may determine that there is a possibility of an anomaly due to the third relay 20C being stuck.

When determining that the first voltage VL has started increasing in S210 (S210: YES), the controller 100 determines whether the measured current elapsed time T, which is the elapsed time T from when the first voltage VL started decreasing at the time of de-energization of the second relay 20B to when the first voltage VL starts increasing, is greater than or equal to the specified reference value Tref (S220). The reference value Tref is set in advance such that if the elapsed time T is greater than or equal to the reference value Tref, the third relay 20C can be determined to have deteriorated.

When determining that the current elapsed time T is greater than or equal to the reference value Tref (S220: YES), the controller 100 increments the value of a counter CTA (S230). The value of the counter CTA indicates the number of times the elapsed time T has been determined to be greater than or equal to the reference value Tref. The value of the counter CTA is retained in a nonvolatile memory after the ignition switch is turned off.

The controller 100 determines whether the incremented value of the counter CTA is greater than or equal to a specified reference value CTAref (S240). The reference value CTAref is set in advance such that if the counter CTA is greater than or equal to the reference value CTAref, it can be determined that the activation delay of the third relay 20C is not temporary, but has occurred repeatedly.

When determining that the incremented value of the counter CTA is greater than or equal to the reference value CTAref (S240: YES), the controller 100 determines that the third relay 20C has deteriorated (S250), and resets the elapsed time T (S270). The controller 100 then temporarily suspends the current process.

When determining that the elapsed time T is less than the reference value Tref in S220 (S220: NO), the controller 100 executes the process of S260 to reset the counter CTA to 0. Then, the controller 100 executes the process of S270 and temporarily suspends the current process.

When determining that the incremented value of the counter CTA is less than the reference value CTAref in S240 (S240: NO), the controller 100 resets the elapsed time T without executing the process of S250 (S270). The controller 100 then temporarily suspends the current process.

An operation and advantages of the present embodiment will now be described.

(1-1) The determination process shown in FIG. 4 determines in S250 that the third relay 20C has deteriorated if the determination condition is met. The determination condition includes a condition that the elapsed time T is greater than or equal to the reference value Tref (S220: YES).

Even in a relay that has not deteriorated, a foreign object that is temporarily attached to the movable portion of the movable contact may cause the elapsed time T to be greater than or equal to the reference value Tref. However, a temporarily attached foreign object is often removed by motions of the movable contact. Thus, the elapsed time T is unlikely to become greater than or equal to the reference value Tref successively.

In the present embodiment, the third relay 20C is determined to have deteriorated in S250 when the elapsed time T is greater than or equal to the reference value Tref (S220: YES), and, in addition, the value of the counter CTA is greater than or equal to the reference value CTAref (S240: YES). That is, the present embodiment additionally has the determination of S240, which determines whether affirmative determination of S220 (i.e. the elapsed time T being greater than or equal to the reference value Tref) has been made a specified number of times or more, successively. This properly determines that the third relay 20C has deteriorated, while preventing a temporary operation anomaly of the third relay 20C from being erroneously determined to be deterioration of the third relay 20C.

Second Embodiment

A controller 100 for a power supply circuit 200 according to a second embodiment will now be described with reference to FIG. 5.

The controller 100 of the present embodiment executes a determination process that is partially different from the process of the first embodiment shown in FIG. 4. The determination process of the present embodiment will now be described.

Figure 5:
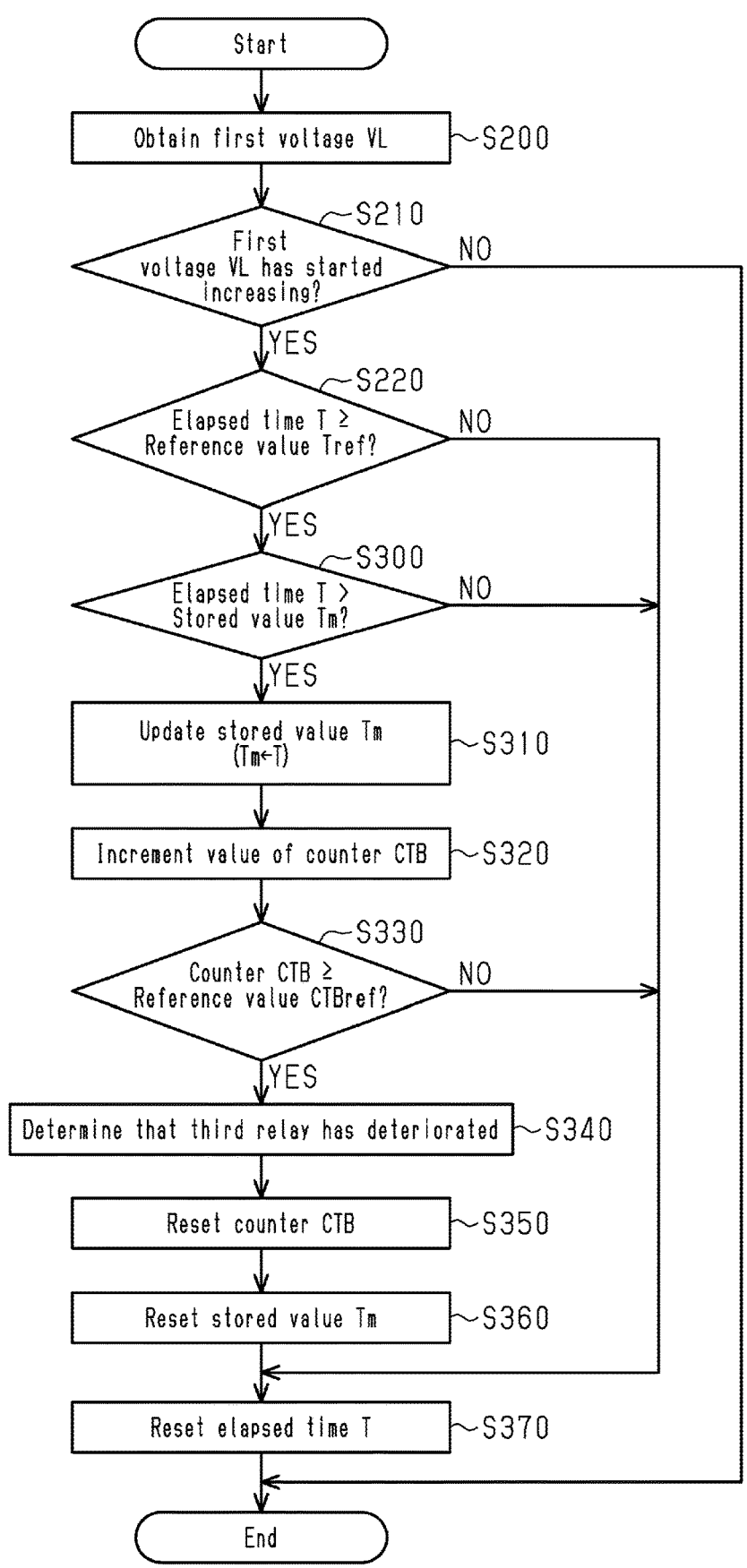
FIG. 5 is a flowchart showing a procedure of a determination process executed by a controller of a second embodiment.

FIG. 5 illustrates the procedure of a process executed by the controller 100 to determine deterioration of the third relay 20C.

At the start of this process, the controller 100 obtains the first voltage VL (S200).

Next, the controller 100 determines whether the first voltage VL, which started decreasing when the second relay 20B was de-energized, has started increasing (S210). When determining that the first voltage VL has not started increasing (S210: NO), the controller 100 temporarily suspends the current process.

In contrast, when determining that the first voltage VL has started increasing (S210: YES), the controller 100 determines whether the measured current elapsed time T, which is the elapsed time T from when the first voltage VL started decreasing at the time of de-energization of the second relay 20B to when the first voltage VL starts increasing, is greater than or equal to the specified reference value Tref (S220). The reference value Tref is the same as the reference value Tref of the first embodiment.

When determining that the current elapsed time T is greater than or equal to the reference value Tref (S220: YES), the controller 100 determines whether the current elapsed time T is greater than a stored value Tm (S300). The initial value of the stored value Tm is 0. When the elapsed time T is greater than or equal to the stored value Tm, the stored value Tm is updated by being set to the elapsed time T.

When determining that the current elapsed time T is greater than the stored value Tm in S300 (S300: YES), the controller 100 updates the stored value Tm (S310) and increments the value of a counter CTB (S320). The value of the counter CTB indicates the number of times the stored value Tm has been updated, that is, the number of times the elapsed time T has been determined to be greater than the maximum value of the stored elapsed time T. A relatively large value of the counter CTB indicates that the elapsed time T is increasing. The value of the counter CTB is retained in a nonvolatile memory after the ignition switch is turned off.

The controller 100 determines whether the incremented value of the counter CTB is greater than or equal to a specified reference value CTBref (S330). The reference value CTBref is set in advance such that if the value of the counter CTB is greater than or equal to the reference value CTBref, it can be determined that the elapsed time T is increasing.

When determining that the incremented value of the counter CTB is greater than or equal to the reference value CTBref (S330: YES), the controller 100 determines that the third relay 20C has deteriorated (S340). Then, the controller 100 resets the counter CTB to 0 (S350), resets the stored value Tm (S360), and resets the elapsed time T (S370). The controller 100 then temporarily suspends the current process.

When determining that the elapsed time T is less than the reference value Tref in S220 (S220: NO), when determining that the elapsed time T is less than or equal to the stored value Tm in S300 (S300: NO), or when determining that the value of the counter CTB is less than the reference value CTBref in S330 (S330: NO), the controller 100 executes the process of S370 to reset the elapsed time T, and temporarily suspends the current process.

An operation and advantages of the present embodiment will now be described.

(2-1) The determination process shown in FIG. 5 also determines in S340 that the third relay 20C has deteriorated if the determination condition is met that includes a condition that the elapsed time T is greater than or equal to the reference value Tref (S220: YES).

Even in a relay that has not deteriorated, a foreign object that is temporarily attached to the movable portion of the movable contact may cause the elapsed time T to be greater than or equal to the reference value Tref. However, a temporarily attached foreign object is often removed by motions of the movable contact. It is thus unlikely that the elapsed time T will increase.

In the present embodiment, the third relay 20C is determined to have deteriorated in S340 when the elapsed time T is greater than or equal to the reference value Tref (S220: YES), and, in addition, the value of the counter CTB is greater than or equal to the reference value CTBref (S330: YES). That is, the affirmative determination of S220 further includes another affirmative determination of S340, which is the condition that the elapsed time T is increasing. This properly determines that the third relay 20C has deteriorated, while preventing a temporary operation anomaly of the third relay 20C from being erroneously determined to be deterioration of the third relay 20C.

The above-described embodiments may be modified as follows. The above-described embodiments and the following modifications can be combined as long as the combined modifications remain technically consistent with each other.

In the first embodiment, the third relay 20C is determined to have deteriorated when the elapsed time T is greater than or equal to the reference value Tref (S220: YES), and, in addition, the determination that the elapsed time T is greater than or equal to the reference value Tref has been made a specified number of times or more, successively (S240: YES). Alternatively, deterioration of the third relay 20C may be determined by a more simplified determination process shown in FIG. 6.

Figure 6:
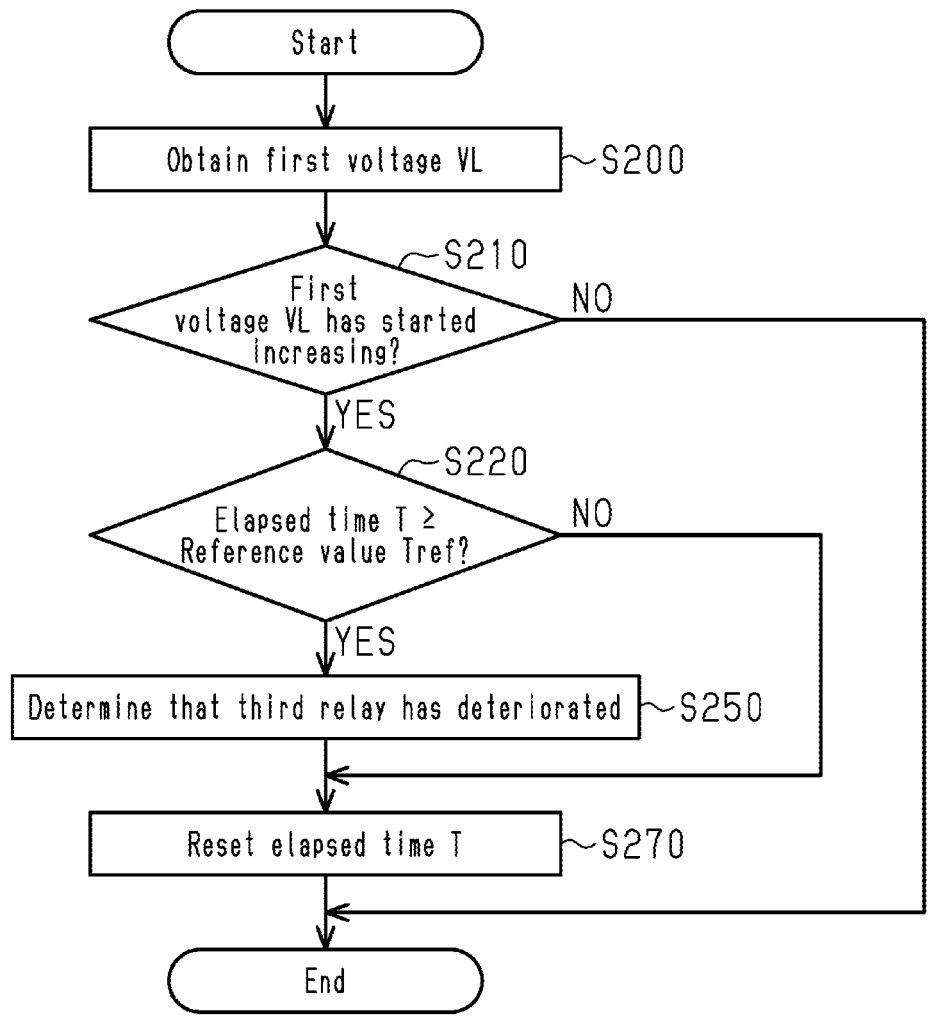
FIG. 6 is a flowchart showing a procedure of a determination process according to a modification of the first embodiment of FIG. 4.

That is, at the start of the determination process of the modification shown in FIG. 6, the controller 100 obtains the first voltage VL (S200).

Next, the controller 100 determines whether the first voltage VL, which started decreasing when the second relay 20B was de-energized, has started increasing (S210). When determining that the first voltage VL has not started increasing (S210: NO), the controller 100 temporarily suspends the current process.

In contrast, when determining that the first voltage VL has started increasing (S210: YES), the controller 100 determines whether the measured current elapsed time T, which is the elapsed time T from when the first voltage VL started decreasing at the time of de-energization of the second relay 20B to when the first voltage VL starts increasing, is greater than or equal to the specified reference value Tref (S220). The reference value Tref is the same as the reference value Tref of the first embodiment.

When determining that the current elapsed time T is greater than or equal to the reference value Tref (S220: YES), the controller 100 determines that the third relay 20C has deteriorated (S250), and resets the elapsed time T (S270). The controller 100 then temporarily suspends the current process.

When determining that the elapsed time T is less than the reference value Tref in S220 (S220: NO), the controller 100 resets the elapsed time T without executing the process of S250 (S270). The controller 100 then temporarily suspends the current process.

Even with this modification, the third relay 20C is determined have deteriorated in S250 if the elapsed time T is greater than or equal to the reference value Tref (S220: YES). This at least allows for determination that the third relay 20C has deteriorated.

In the above-described embodiments and modification, the first voltage VL is obtained as the monitored value (S200). As described above, the second voltage VH is equal to the first voltage VL when the converter 310 and the inverter 320 are not operating immediately after the power supply circuit 200 starts supplying power to the load 300. Thus, in place of the first voltage VL, the second voltage VH may be obtained as the monitored value.

The second relay 20B, the resistor 30, and the third relay 20C may be connected the positive electrode of the battery 10, and the first relay 20A may be connected to the negative electrode of the battery 10.

The controller 100 is not limited to a device that includes the CPU 110 and the memory 120 and executes software processing. For example, a dedicated hardware circuit (such as an application-specific integrated circuit (ASIC)) may be provided that executes at least part of the software processing executed in each of the above-described embodiments. That is, the controller 100 may be modified as long as it has any one of the following configurations (a) to (c). (a) A configuration including a processor that executes all of the above-described processes according to programs and a program storage device such as a memory (including a non-transitory computer readable memory medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. Multiple software processing circuits each including a processor and a program storage device and multiple dedicated hardware circuits may be provided. That is, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a power supply circuit, wherein
the power supply circuit includes a battery and relays,
the relays include
a first relay that is connected to and located between a load and one of a positive electrode or a negative electrode of the battery,
a second relay that is connected to and located between the load and the other one of the positive electrode or the negative electrode of the battery, the second relay being connected in series with a resistor, and
a third relay that is connected in parallel with the second relay and the resistor, and
the controller is configured to execute
a process that obtains, as a monitored value, a voltage of power supplied to the load from the power supply circuit,
a sequence process that is executed when power starts being supplied to the load, the sequence process energizing the first relay, the second relay, and the third relay in that order, and then de-energizing the second relay,
a process that measures, in a case in which the monitored value starts decreasing from when the second relay is de-energized while the first relay and the third relay are energized by execution of the sequence process, elapsed time from when the monitored value starts decreasing to when the monitored value starts increasing,
a process that determines that the third relay has deteriorated when a determination condition, which includes a condition that the elapsed time is greater than or equal to a specified reference value, is met, and
a process that increments a counter if the elapsed time is greater than a stored value of elapsed time and overwrites the stored value of elapsed time with the elapsed time,
wherein the determination condition requires the counter to be greater than or equal to a specified reference count.

2. The controller for a power supply circuit according to claim 1, wherein the determination condition includes the condition that the elapsed time is greater than or equal to the reference value, and a condition that the determination that the elapsed time is greater than or equal to the reference value has been made a specified number of times or more, successively.

3. The controller for a power supply circuit according to claim 1, wherein the determination condition includes the condition that the elapsed time is greater than or equal to the reference value, and a condition that the elapsed time is increasing.

4. The controller for a power supply circuit according to claim 1, wherein the third relay includes a contact portion, the contact portion of the third relay is open at the time the monitored value starts decreasing when the second relay is de-energized.

5. The controller for a power supply circuit according to claim 4, wherein the monitored value, which has been decreasing, starts increasing when the contact portion of the third relay closes.

6. The controller for a power supply circuit according to claim 5, wherein the contact portion of the third relay includes a movable contact and a fixed contact, the third relay is energized to make the movable contact of the third relay contacts the fixed contact of the third relay,
an activation delay of the third relay from when the third relay is energized to when the movable contact of the third relay contacts the fixed contact of the third relay extends the elapsed time.

7. A control method for a power supply circuit, wherein
the power supply circuit includes a battery and relays,
the relays include
a first relay that is connected to and located between a load and one of a positive electrode or a negative electrode of the battery,
a second relay that is connected to and located between the load and the other one of the positive electrode or the negative electrode of the battery, the second relay being connected in series with a resistor, and
a third relay that is connected in parallel with the second relay and the resistor, and
the control method comprises:
obtaining, as a monitored value, a voltage of power supplied to the load from the power supply circuit;
executing a sequence process when the power starts being supplied to the load, the sequence process energizing the first relay, the second relay, and the third relay in that order, and then de-energizing the second relay;
measuring, in a case in which the monitored value starts decreasing from when the second relay is de-energized while the first relay and the third relay are energized by execution of the sequence process, elapsed time from when the monitored value starts decreasing to when the monitored value starts increasing;
determining that the third relay has deteriorated when a determination condition, which includes a condition that the elapsed time is greater than or equal to a specified reference value, is met; and
incrementing a counter if the elapsed time is greater than a stored value of elapsed time and overwriting the stored value of elapsed time with the elapsed time,
wherein the determination condition requires the counter to be greater than or equal to a specified reference count.

8. The control method for a power supply circuit according to claim 7, wherein the third relay includes a contact portion, the contact portion of the third relay is open at the time the monitored value starts decreasing when the second relay is de-energized.

9. The control method for a power supply circuit according to claim 8, wherein the monitored value, which has been decreasing, starts increasing when the contact portion of the third relay closes.

10. The control method for a power supply circuit according to claim 9, wherein the contact portion of the third relay includes a movable contact and a fixed contact, the third relay is energized to make the movable contact of the third relay contacts the fixed contact of the third relay,
an activation delay of the third relay from when the third relay is energized to when the movable contact of the third relay contacts the fixed contact of the third relay extends the elapsed time.

11. A non-transitory computer readable medium that stores a program that causes a processor to execute a control process for a power supply circuit, wherein
the power supply circuit includes a battery and relays,
the relays include
a first relay that is connected to and located between a load and one of a positive electrode or a negative electrode of the battery,
a second relay that is connected to and located between the load and the other one of the positive electrode or the negative electrode of the battery, the second relay being connected in series with a resistor, and
a third relay that is connected in parallel with the second relay and the resistor, and
the control process includes:
obtaining, as a monitored value, a voltage of power supplied to the load from the power supply circuit;
executing a sequence process when the power starts being supplied to the load, the sequence process energizing the first relay, the second relay, and the third relay in that order, and then de-energizing the second relay;
measuring, in a case in which the monitored value starts decreasing from when the second relay is de-energized while the first relay and the third relay are energized by execution of the sequence process, elapsed time from when the monitored value starts decreasing to when the monitored value starts increasing; and
determining that the third relay has deteriorated when a determination condition, which includes a condition that the elapsed time is greater than or equal to a specified reference value, is met,
wherein incrementing a counter if the elapsed time is greater than a stored value of elapsed time and overwriting the stored value of elapsed time with the elapsed time, and
wherein the determination condition requires the counter to be greater than or equal to a specified reference count.

12. The non-transitory computer readable medium according to claim 11, wherein the third relay includes a contact portion, the contact portion of the third relay is open at the time the monitored value starts decreasing when the second relay is de-energized.

13. The non-transitory computer readable medium according to claim 12, wherein the monitored value, which has been decreasing, starts increasing when the contact portion of the third relay closes.

14. The non-transitory computer readable medium according to claim 13, wherein the contact portion of the third relay includes a movable contact and a fixed contact, the third relay is energized to make the movable contact of the third relay contacts the fixed contact of the third relay,
an activation delay of the third relay from when the third relay is energized to when the movable contact of the third relay contacts the fixed contact of the third relay extends the elapsed time.

* * * * *